United States Patent
Stronkhorst

(10) Patent No.: US 10,787,320 B2
(45) Date of Patent: Sep. 29, 2020

(54) DEVICE COMPRISING A CONVEYOR

(71) Applicant: Optimus Sorter Holding B.V., Beuningen (NL)

(72) Inventor: Willem Dagobert Stronkhorst, Beuningen (NL)

(73) Assignee: Optimus Sorter Holding B.V., Beuningen (NL)

( * ) Notice: Subject to any disclaimer, the term of this patent is extended or adjusted under 35 U.S.C. 154(b) by 0 days.

(21) Appl. No.: 16/783,889

(22) Filed: Feb. 6, 2020

(65) Prior Publication Data
US 2020/0255224 A1    Aug. 13, 2020

(30) Foreign Application Priority Data
Feb. 8, 2019 (NL) ..................................... 2022537

(51) Int. Cl.
     *B65G 17/42*      (2006.01)
     *B65G 35/08*      (2006.01)
     *B65G 47/84*      (2006.01)

(52) U.S. Cl.
CPC ............. *B65G 35/08* (2013.01); *B65G 17/42* (2013.01); *B65G 47/844* (2013.01); *B65G 2811/0657* (2013.01)

(58) Field of Classification Search
CPC ....... B65G 17/42; B65G 35/08; B65G 47/844
USPC .................... 198/370.02, 370.07, 836.3, 890
See application file for complete search history.

(56) References Cited

U.S. PATENT DOCUMENTS

| | | | |
|---|---|---|---|
| 5,909,797 A * | 6/1999 | Van Den Goor | B65G 17/086 198/370.02 |
| 8,151,969 B2 * | 4/2012 | Hoene | B65G 47/82 198/370.07 |
| 8,297,430 B2 * | 10/2012 | Van Den Goor | B65G 17/066 198/370.02 |
| 8,770,379 B2 * | 7/2014 | Van Den Goor | B65G 47/844 198/370.02 |
| 9,242,806 B2 * | 1/2016 | Hopman | B65G 47/766 |
| 9,573,773 B2 * | 2/2017 | Otto | B65G 17/22 |
| 9,919,879 B2 * | 3/2018 | Kuijpers | B65G 17/065 |

(Continued)

FOREIGN PATENT DOCUMENTS

| | | |
|---|---|---|
| DE | 199 59 843 | 6/2001 |
| ES | 2 381 832 | 6/2012 |
| GB | 676142 | 7/1952 |

(Continued)

*Primary Examiner* — Douglas A Hess
(74) *Attorney, Agent, or Firm* — Tatonetti IP

(57) ABSTRACT

A device comprising a conveyor such as a sorter comprises a support surface for an object, and a moveable barrier, wherein said barrier comprises a bottom side for contact with the support surface and a top side, and is moveable relative to the support surface with a directional component, which directional component is i) parallel to the support surface and ii) transverse to the direction of movement of the support surface. So as to reduce the risk of an object getting stuck between the barrier and the support surface, the barrier comprises a multitude of independently moveable barrier elements having free distal ends for contact with the support surface and defining the bottom edge of the barrier, wherein the barrier elements are mounted such that the distal ends of the barrier element are moveable with a vertical directional component.

11 Claims, 8 Drawing Sheets

(56) References Cited

U.S. PATENT DOCUMENTS

2016/0083197 A1   3/2016  Otto

FOREIGN PATENT DOCUMENTS

| JP | 07206147 | 1/1994 |
|----|----------|--------|
| JP | 2012201464 | 10/2012 |

* cited by examiner

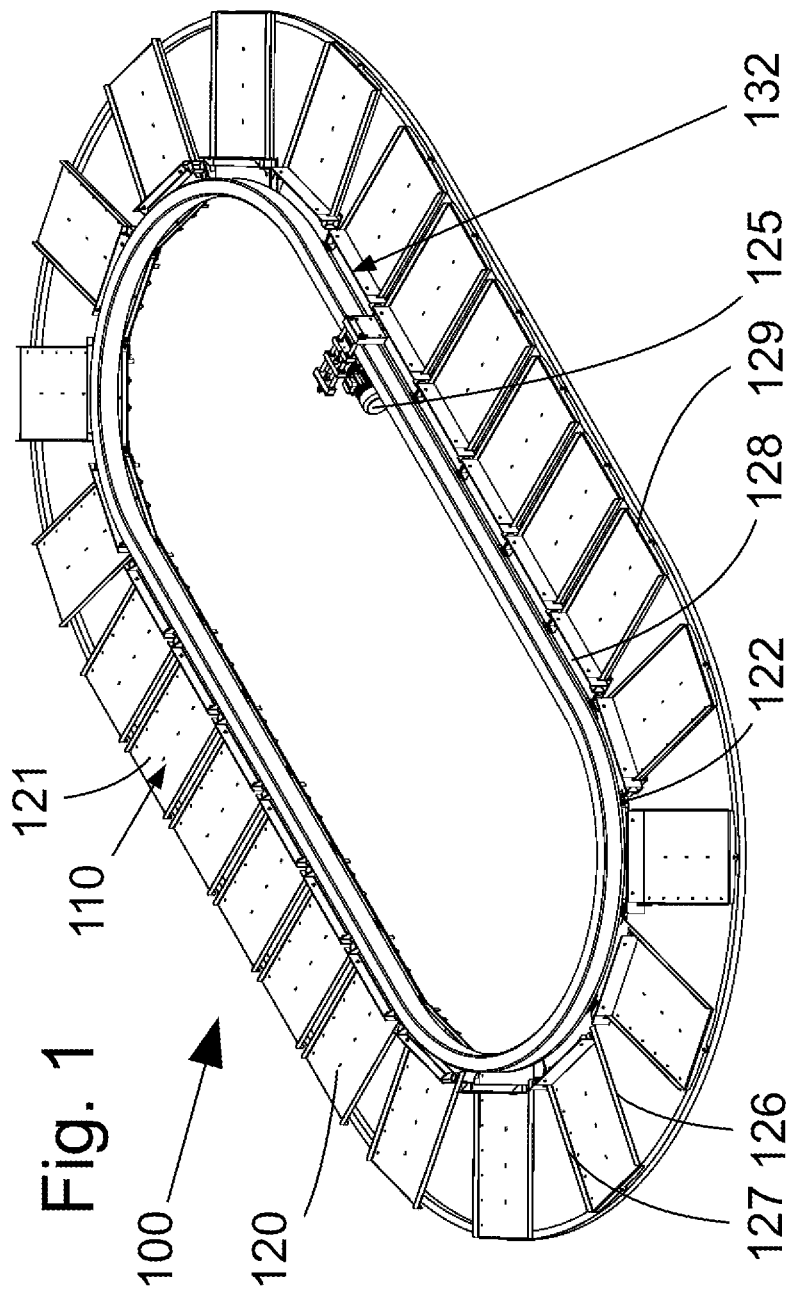

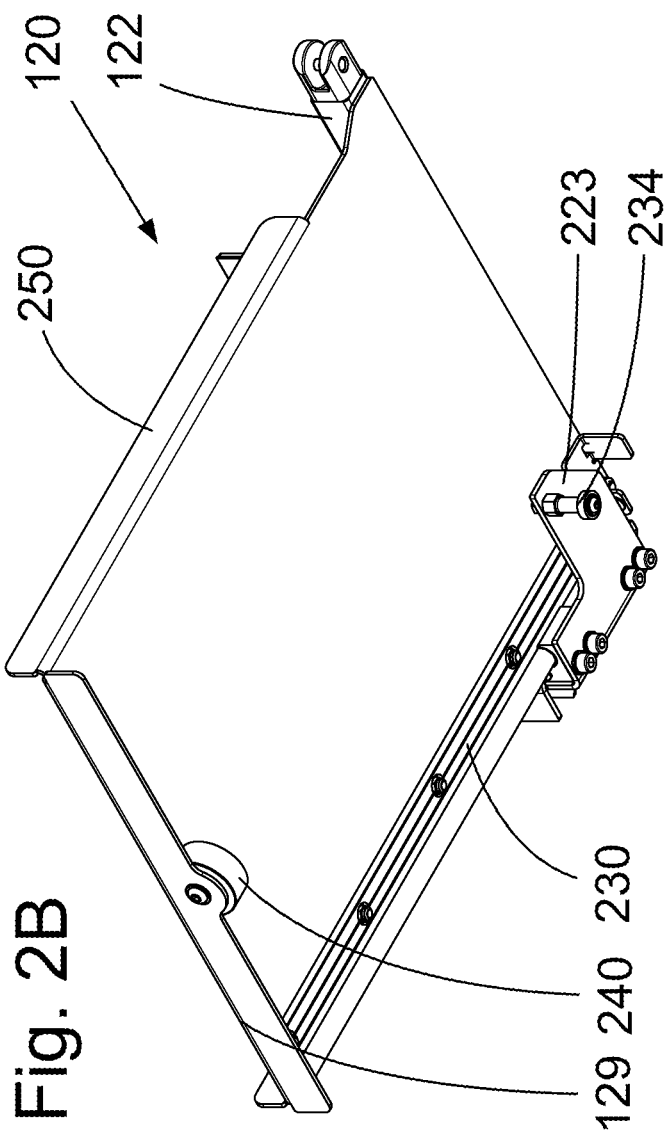

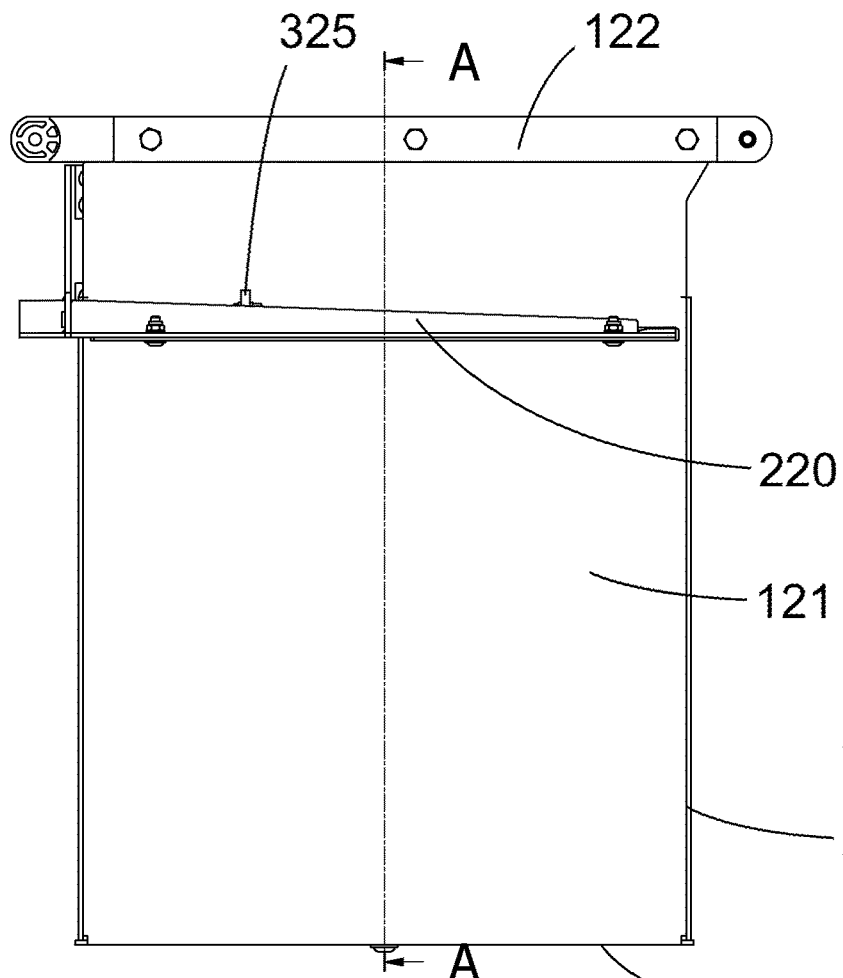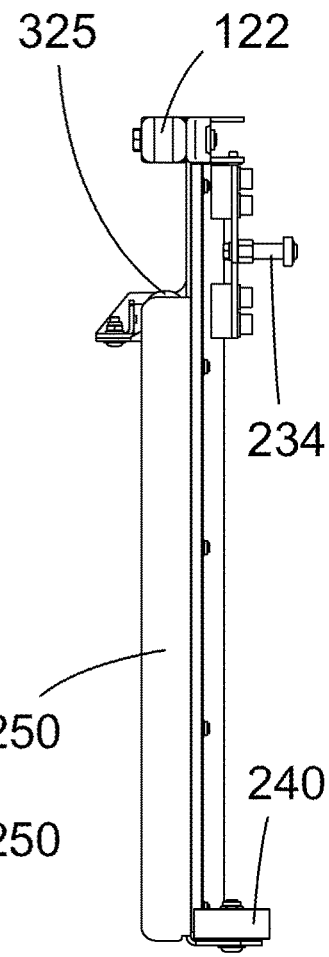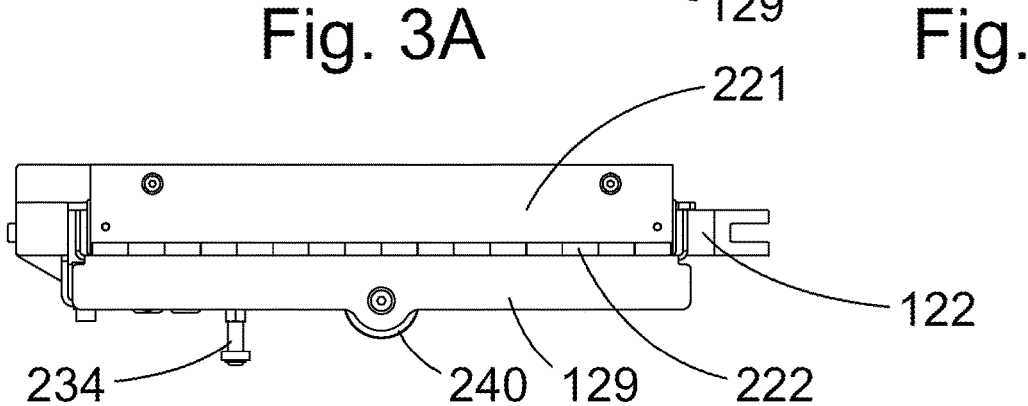
Fig. 3A  Fig. 3B
Fig. 3C

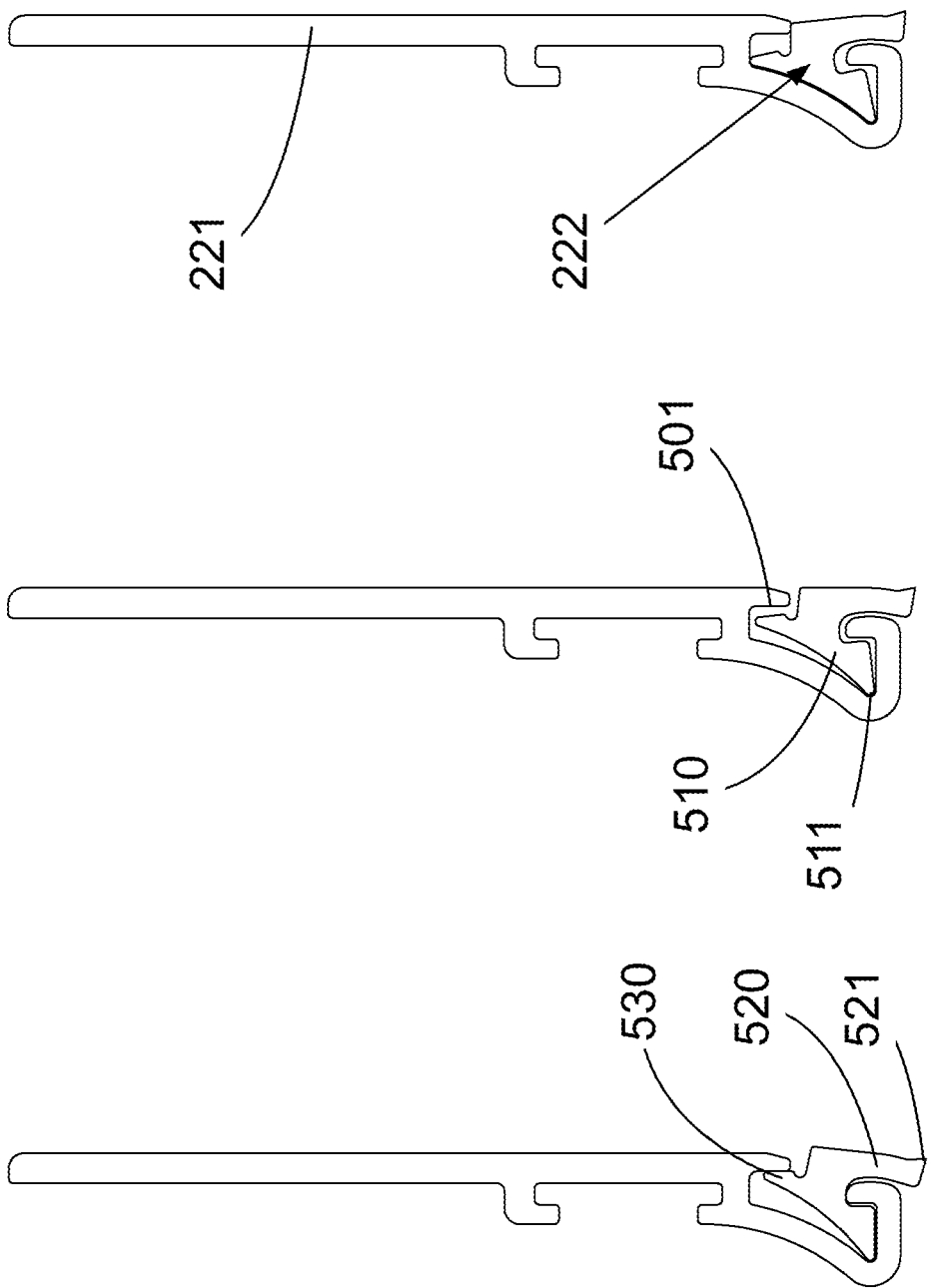

DEVICE COMPRISING A CONVEYOR

CROSS-REFERENCE TO RELATED APPLICATIONS

This Non-provisional Utility application claims the benefit of and priority to Netherlands Application Serial No. 2022537, filed Feb. 8, 2019, entitled "A Device Comprising a Conveyor," the entire contents of which is hereby incorporated herein by reference.

BACKGROUND

In the art, a device comprising a conveyor is generally known, for example for check outs in stores or for sorters where packages may need to be delivered at a multitude of exits (e.g. chutes or further conveyors).

It is a problem that an object may get caught between the barrier and the support surface. Raising the barrier is not a viable option because then the barrier would not be able to act as a stop for relatively flat objects, such as cards and letters. Even relatively high objects may get caught between the barrier and the support surface, if the packaging protrudes, e.g. a fold thereof or a protruding flap.

For a check-out counter in a store, an object stuck between the barrier and the support surface of a conveyor belt can be inconvenient for a customer desiring to collect the purchased object. In case of a sorter, the object may end up in the wrong exit or even not pushed from the conveyor at all.

JPH07206147 discloses a diverter for a conveyor capable of certainly delivering a load from a steel belt even a thin load according to the preamble.

SUMMARY

The present invention relates to a device comprising a conveyor, said conveyor
 having a support surface for an object, and
 a barrier, wherein said barrier
  comprises a bottom side for contact with the support surface and a top side, and
  is moveable relative to the support surface with a directional component, which directional component is i) parallel to the support surface and ii) transverse to the direction of movement of the support surface;
 wherein the barrier comprises a multitude of independently moveable barrier elements having free distal ends for contact with the support surface and defining the bottom edge of the barrier, wherein the barrier elements are mounted such that the distal ends of the barrier element are moveable with a vertical directional component.

The object of the present invention is to reduce the problem discussed in the Background section above.

To this end, a device according to the preamble is characterized in that wherein the barrier comprises a barrier body, said barrier body comprises an oversized slot oriented transverse to the vertical, and the barrier elements are mounted in the slot with the distal ends thereof protruding from the slot.

The elements reduce the risk of a slit forming below the barrier that may trap an object between the barrier and the support surface. Thus, the elements are capable of following deviations in the support surface of the conveyor, thus reducing the risk of an object getting trapped below it.

The barrier can be manufactured cheaply, as the barrier elements can be inserted from the side of the barrier body into the slot. The slot being oriented transverse to the vertical effectively results in the slot extending parallel to the support surface. If desired the barrier body is provided with one or two caps to close the slot.

The device is for example a device comprising a conveyor for the check out at a store. The barrier is serves to keep the purchased articles of consecutive clients separated. The barrier is typically a barrier with i) one end hingedly fixed to a frame of the check-out counter at the downstream end of the conveyor and ii) a free distal end upstream of the hingedly fixed end, which free distal end is above the conveyor (conveyor belt).

The multitude is typically at least 3 per barrier, preferably at least 5 and more preferably at least 10.

US2016083197 discloses a conveyor for transporting objects includes a rail arrangement which includes a first rail track and a second rail track extending parallel to the first rail track; coupling elements guided in the second rail track and drivable with a drive device along the second rail track; and plural deposit tables for receiving the objects thereon, with at least two of the deposit tables being fastened on each of the coupling elements and slidingly or rollingly supported on the first rail track, each of said deposit tables having a pusher which is movable transversely to a transport direction of the deposit tables for pushing the objects off the deposit tables.

According to a favourable embodiment, that the barrier body can move in a path across the support surface, said path defining an average level of the support surface and the barrier body is mounted movably at a distance from said average level wherein the barrier elements are moveable both up and down.

Thus, the barrier elements are "floating" and will be able to accommodate for irregularities in the support surface irrespective of whether these are bumps or valleys.

The height of the barrier body may for example be determined by i) a guide or hinge defining the path of the barrier body, or ii) by a spacer element such as a sliding block or wheel.

According to a favourable embodiment, the device is a sorter.

Sorters are an important field of application for the invention, as any interruption of the sorting process or failed sorting may require human intervention and/or cause delay.

According to a favourable embodiment, the sorter is a tray sorter comprising a multitude of trays, wherein a tray of the tray sorter comprises the moveable barrier comprising a multitude of barrier elements.

Tray sorters are an important field of application for the invention. The barrier is capable of moving from a first retracted position to a second extended position.

Typically all the trays of the tray sorter are provided with the barriers comprising the multitude of barrier elements.

According to a favourable embodiment, the barrier comprises a wheel for running over the support surface.

Thus the weight of the barrier is not transferred via the barrier elements to the support surface. This reduces the likelihood that an object remains trapped under a barrier element.

According to a favourable embodiment, the bottom section of the barrier comprises a concave back.

Thus a barrier comprising the barrier elements in accordance with the present invention does not need to occupy much more space, if any more at all. This embodiment is in particular applicable in case of V-shaped barrier elements.

According to a favourable embodiment, the movability of the barrier elements comprises rotatability about an axis parallel to the support surface and over an angle α of less than 45°.

This allows the distal ends of the barrier elements to remain in contact with the support surface, reducing the risk of not pushing an object on the support surface away and/or entraining it when the barrier moves back.

Typically the angle α is at least 5°, such as at least 10°.

Typically the angle α is less than 45°, such as at most 35°.

According to a favourable embodiment, the movability of the barrier elements comprises translatability with a vertical component.

This allows the distal ends of the barrier elements to remain in contact with the support surface, reducing the risk of not pushing an object on the support surface away and/or entraining it when the barrier moves back.

According to a favourable embodiment, the barrier elements are V-shaped with a relatively short leg received in the slot and a relatively long leg protruding from the slot.

Such a barrier element mounted in an oversized slot can provide both a rotational degree of freedom and a translational degree of freedom with a vertical component. This ensures that the barrier element can more easily contact the support surface whether it is in a forward going (extending) or backward going (retracting) movement of the barrier.

According to a favourable embodiment, the barrier element comprises an upward facing protrusion that is retained in an oversized top section of the slot and the slot is provided with a stop surface.

This allows the barrier element to be retained securely and allows for a rotational degree of freedom of the barrier element.

According to a favourable embodiment, the distal ends of the barrier elements are defined by a first plane and a second plane, said planes i) extending in the longitudinal direction of the barrier, and ii) being at an acute angle with respect to each other.

This allows for a more reliable pushing of an object on the support surface and a reduced risk of retaining it while the barrier moves back. In case of a sorter, the first plane will be at the side facing an object and at an angle to the horizontal that is greater than the angle of the second plane to the horizontal.

BRIEF DESCRIPTION OF THE DRAWINGS

The present invention will now be illustrated with reference to the drawing where FIG. 1 shows a perspective view on a sorter;

FIG. 2A and FIG. 2B show perspective views of a tray respectively;

FIG. 3A through FIG. 3C respectively show a top view, a side view and a front view on the tray of FIG. 2A;

FIG. 5A through FIG. 5C show a cross-sectional view of a pusher plate comprising a barrier element in three different orientations thereof;

DETAILED DESCRIPTION

Figure 2A:
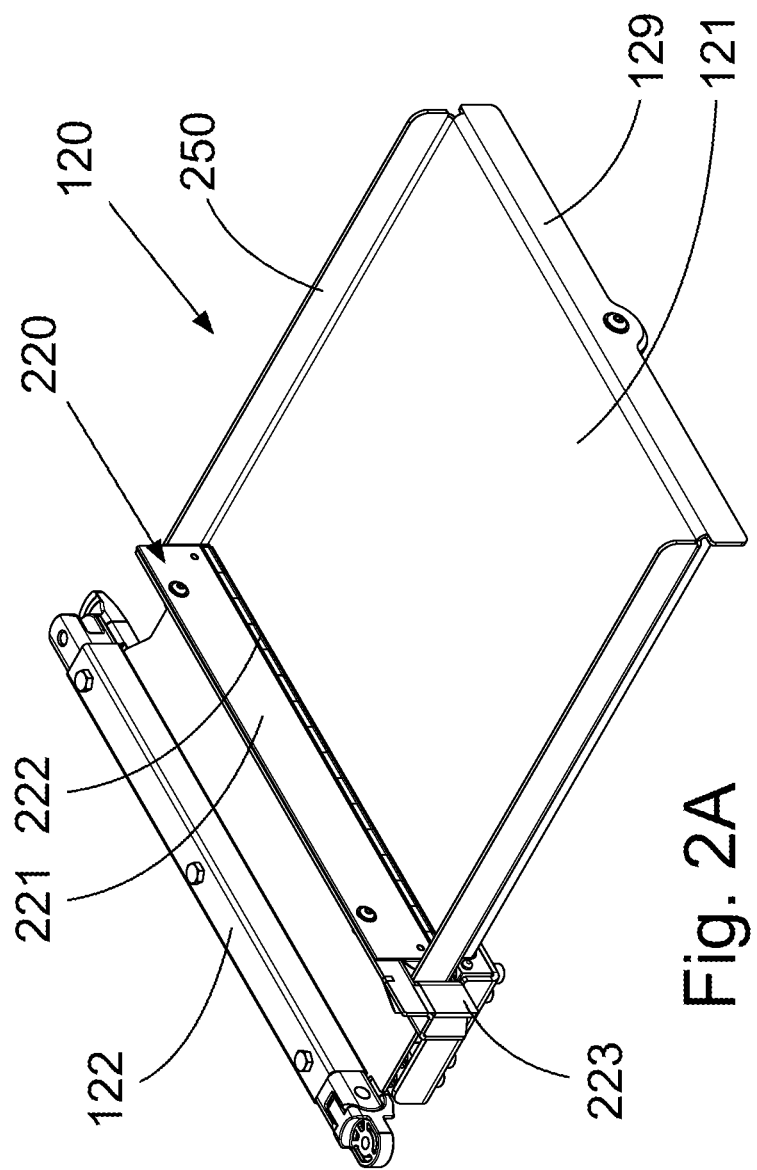

FIG. 1 shows a perspective view on a device 100, more specifically a sorter 100. It comprises a conveyor 110, said conveyor comprising a plurality of trays 120 providing a support surface 121 for an object (not shown) to be transported and sorted. The trays comprise conveyor bars 122, and the conveyor bars 122 of adjacent trays 120 are hingedly linked to form an endless chain 132. This chain 132 is driven using an actuator 125, typically an electric motor 125 to move the trays 120 in a continuous loop. A sorter 100 as described above is generally known in the art.

For the purpose of the description of the present invention, the trays 120 comprise a leading side 126, and a trailing side 127, where in FIG. 1 the conveyor 110 is assumed to run counter-clockwise.

At the side of the conveyor bar is designated the rear side 128 and its opposite side is designated the front side 129.

FIG. 2A and FIG. 2B show a perspective top view and a perspective bottom view of a tray 120 respectively. The tray comprises a moveable barrier 220 (pusher plate 220) comprising a barrier body 221 and at a lower edge there of a a multitude of barrier elements 222 in contact with the support surface 121 of the tray 120.

The tray 120 comprises a guide 230 for the pusher plate 220 so as to allow it to move from a position relatively close to the rear side 128 to the front side 129 and back. To this end, the barrier 220 comprises a frame 223 engaging the guide 230 and provided with protruding pin 234. When the tray 120 is moved, the device 100 may engage the pin 234 so as to push it sideways, which is well-known in itself and doesn't require further elucidation.

The tray 120 comprises a wheel 240 for running along a track of the conveyor and upright sidewalls 250 to keep the object on the support surface 121 of the tray 120.

FIG. 3A through FIG. 3C respectively show a top view, a side view and a front view on the tray of FIG. 2A.

The pusher plate 220 comprises a wheel 325 that allows it to move with little friction across the support surface 121. In the embodiment discussed here, it also determines the distance of the barrier body 221 to the support surface 121.

Figure 4A:
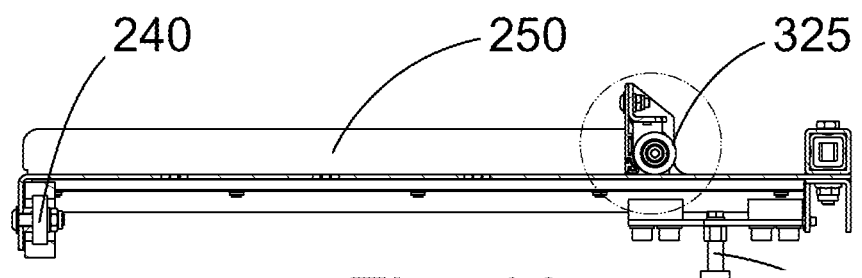
FIG. 4A and FIG. 4B show a cross-sectional view through the tray of FIG. 3B and a detail thereof.
Figure 4B:
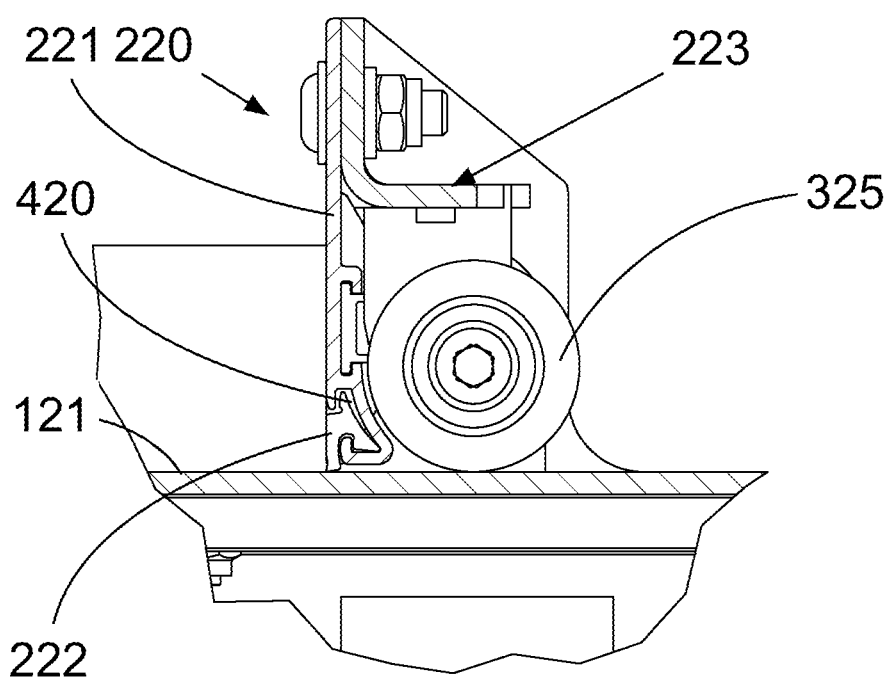

FIG. 4A and FIG. 4B show a cross-sectional view through the tray of FIG. 3B and a detail thereof.

The pusher plate 220 comprises a slot 420 accommodating the barrier element 222 that in this embodiment is V-shaped. The slot 420 is oversized in that it allows tilting of the barrier element 222 and an up and down movement. This allows the barrier element 222 to follow the support surface 121 of the tray 120, and reduces the risk that any object or part thereof gets trapped between the barrier 220 and the support surface 121.

FIG. 5A through FIG. 5C show a cross-sectional view of a pusher plate 220 comprising a barrier element 222 in three different orientations thereof.

In the embodiment discussed here, the barrier element 222 is V-shaped, comprising a first leg 510 comprising a first distal end 511 and a second leg 520 comprising a second distal end 521.

As mentioned above, the wheel 325 maintains a distance between the barrier body 221 and the support surface 121. The barrier element 222 will typically be in a "neutral" orientation as shown in FIG. 5B, which allows the barrier element 222 to move up or down to follow any local irregularity of the support surface (bump or valley) yet stay in contact with the support surface.

Typically, the frontmost side of the barrier element 222 is substantially flush with the frontmost side of the barrier body 221.

The barrier element 222 may tilt depending on the circumstances met, as is explained below.

If the pusher plate 220 is moved to the right (FIG. 5A), friction will cause the barrier element 222 to tilt and stay in contact with the support surface 121. The center of rotation is at the first distal end 511. In case of wear, the barrier elements 222 remain functional, i.e. in contact with support surface 121.

If the pusher plate 229 moves to the left, the friction will generated a lifting moment on the barrier element 222. The only downward force the barrier element 222 can exert is because of its own weight which force will be very small. So, any object or part thereof that would be present below the second distal end 521 is unlikely to be moved along with the pusher plate 220.

FIG. 5A shows the barrier element in one of the extreme tilt orientation (FIG. 5C shows the other). The barrier element 222 comprises a protrusion 530 away from its distal ends that engages the inner wall 501 of the slot 420 facing the rear side 128. Thus even in this extreme orientation, the barrier element 222 can firmly push an object to the right.

Figure 6:
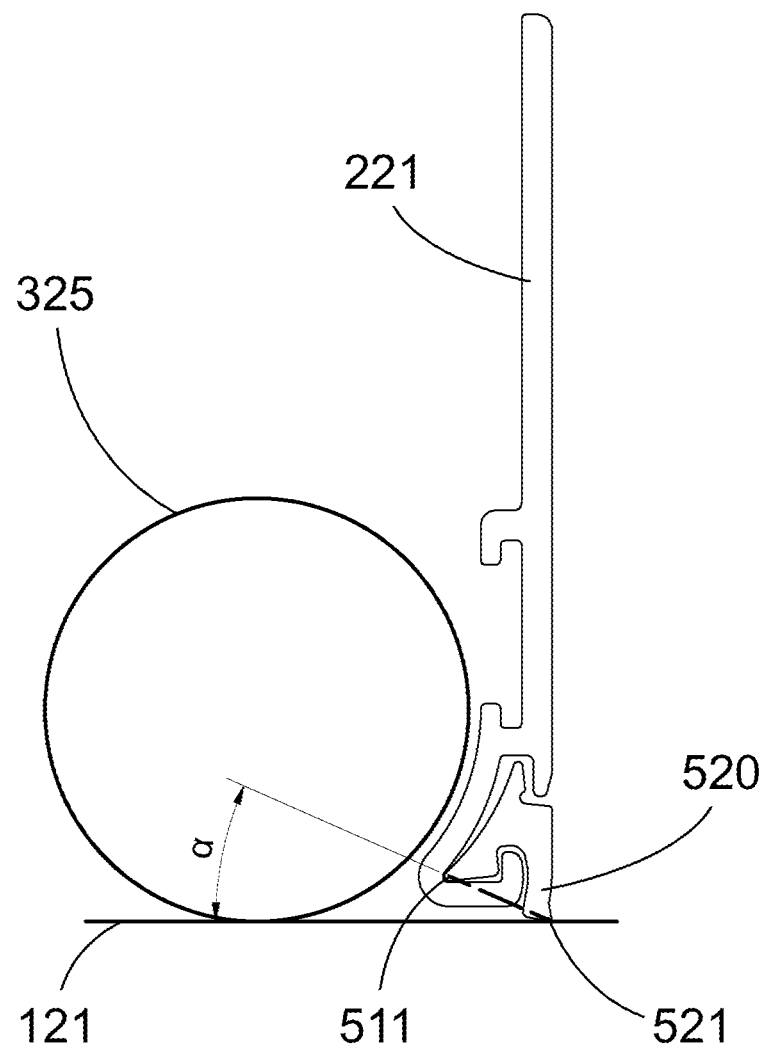
FIG. 6 shows the barrier element of FIG. 5B.

FIG. 6 shows the barrier element of FIG. 5B, and indicates the angle α, as defined by the first distal end 511 where the barrier element 222 rotates, the second distal end 521 where the second leg 520 contacts the support surface 121 and the support surface 121. In the embodiment discussed here, the angle α in the neutral position of the barrier element is 24° and the tilt range is from 18 to 30°.

Figure 7:
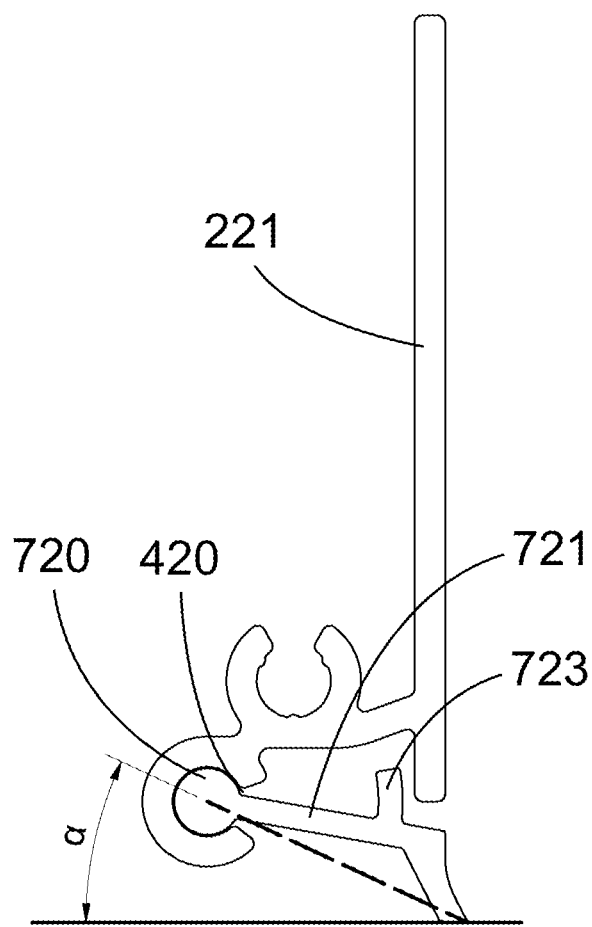
FIG. 7 shows an alternative example of a barrier.

FIG. 7 shows an alternative example of a barrier, wherein the barrier element 222 comprises a slot 420 with a circular cross-section housing a cylindrical member 720 of the barrier element 222, from which a plate 721 protrudes with a tapered distal end. Also there is a protrusion 723 to help to prevent an object from getting caught between the top of the barrier element 222 and the barrier body 221.

The invention claimed is:

1. A device comprising:
a conveyor, said conveyor having:
    a support surface for an object, and
    a barrier, wherein said barrier
        comprises a bottom side for contact with the support surface and a top side, and
        is moveable relative to the support surface with a directional component, in which the directional component is i) parallel to the support surface and ii) transverse to the direction of movement of the support surface;
    wherein the barrier comprises a multitude of independently moveable barrier elements having free distal ends for contact with the support surface and defining the bottom edge of the barrier, wherein the barrier elements are mounted such that the distal ends of each barrier element are moveable with a vertical directional component;
    wherein the barrier comprises a barrier body, said barrier body comprises an oversized slot oriented transverse to the vertical, and the barrier elements are mounted in the slot with the distal ends thereof protruding from the slot.

2. The device of claim 1, wherein the barrier body can move in a path across the support surface, said path defining an average level of the support surface and the barrier body is mounted movably at a distance from said average level wherein the barrier elements are moveable both up and down.

3. The device of claim 1, wherein the device is a sorter.

4. The device of claim 3, wherein the sorter is a tray sorter comprising a multitude of trays, wherein a tray of the tray sorter comprises the moveable barrier comprising a multitude of barrier elements.

5. The device of claim 4, wherein the barrier comprises a wheel for running over the support surface.

6. The device of claim 5, wherein the bottom section of the barrier comprises a concave back.

7. The device of claim 1, wherein the movability of the barrier elements comprises rotatability about an axis parallel to the support surface and over an angle α of less than 45°.

8. The device of claim 7, wherein the movability of the barrier elements comprises translatability with a vertical component.

9. The device of claim 8, wherein the barrier elements are V-shaped with a relatively short leg received in the slot and a relatively long leg protruding from the slot.

10. The device of claim 9, wherein each barrier element comprises an upward facing protrusion that is retained in an oversized top section of the slot and the slot is provided with a stop surface.

11. The device of claim 10, wherein the distal ends of the barrier elements are defined by a first plane and a second plane, said planes i) extending in the longitudinal direction of the barrier, and ii) being at an acute angle with respect to each other.

* * * * *